United States Patent [19]

Sanders et al.

[11] Patent Number: 4,726,602
[45] Date of Patent: Feb. 23, 1988

[54] HAND TRUCK FOR HANDLING BULKY FREIGHT

[75] Inventors: William M. Sanders, Rte. 1, P.O. Box 937, Cartee Rd., Liberty, S.C. 29657; G. Wayne Watts, Easley, S.C.

[73] Assignee: William Melvin Sanders, Greenville, S.C.

[21] Appl. No.: 89,974

[22] Filed: Aug. 27, 1987

[51] Int. Cl.$^4$ .............................................. B62B 1/04
[52] U.S. Cl. ...................................... 280/654; 211/181; 211/195; 280/42; 280/47.18; 280/47.2; 280/47.29; 280/79.3; 280/659
[58] Field of Search ................... 280/79.3, 654, 652, 280/659, 47.24, 47.2, 47.18, 47.29, 42, 33.99 H, 33.99 R; 211/181, 118, 195, 198

[56] References Cited

U.S. PATENT DOCUMENTS

| | | | |
|---|---|---|---|
| 454,461 | 6/1891 | Dye | 280/46 |
| 486,469 | 11/1892 | Hoogerzeil | |
| 1,134,258 | 4/1915 | Curtis | |
| 1,418,754 | 6/1922 | Vangiesen | |
| 1,631,333 | 6/1927 | Privat | 280/47.18 |
| 2,277,302 | 3/1942 | Chenette | 280/659 |
| 2,430,107 | 11/1947 | Cronrath | 280/47.27 |
| 2,784,004 | 3/1957 | Hamrick, Jr. | 280/47.27 |
| 3,443,821 | 5/1969 | Alexander | 280/659 |
| 4,220,346 | 9/1980 | Geschwender | 280/47.18 |
| 4,281,849 | 8/1981 | Chandick et al. | 280/655 |
| 4,284,286 | 8/1981 | Lewallen | 280/30 |

Primary Examiner—John J. Love
Assistant Examiner—Eric Culbreth
Attorney, Agent, or Firm—Dority & Manning

[57] ABSTRACT

A hand truck comprising a main frame which is supported by a plurality of wheels on one end and has a handle on the other end is disclosed. The main frame is provided with platforms which extend the load bearing surface of the main frame. Each of the platforms is provided with side members which extend outwardly from the surface of said platforms. Each of the side members in turn have a toe plate extension which is adapted to engage and attach to a toe plate which extends outwardly from the main frame on the side opposite from where the wheels are supported. The platforms, the side members, the toe plate and the toe plate extensions combine to form a three-sided load carrying compartment for handling bulky freight such as loaf bread and the like. Swivel rollers may be provided on the underside of the toe plate for allowing lateral movement of the hand truck. When the hand truck is not being used to transport freight, the platforms and their associated side members and toe plate extensions are adapted to be collapsed and folded to rest upon the surface of the main frame in a manner which causes the hand truck to occupy little more space than a conventional hand truck.

18 Claims, 7 Drawing Figures

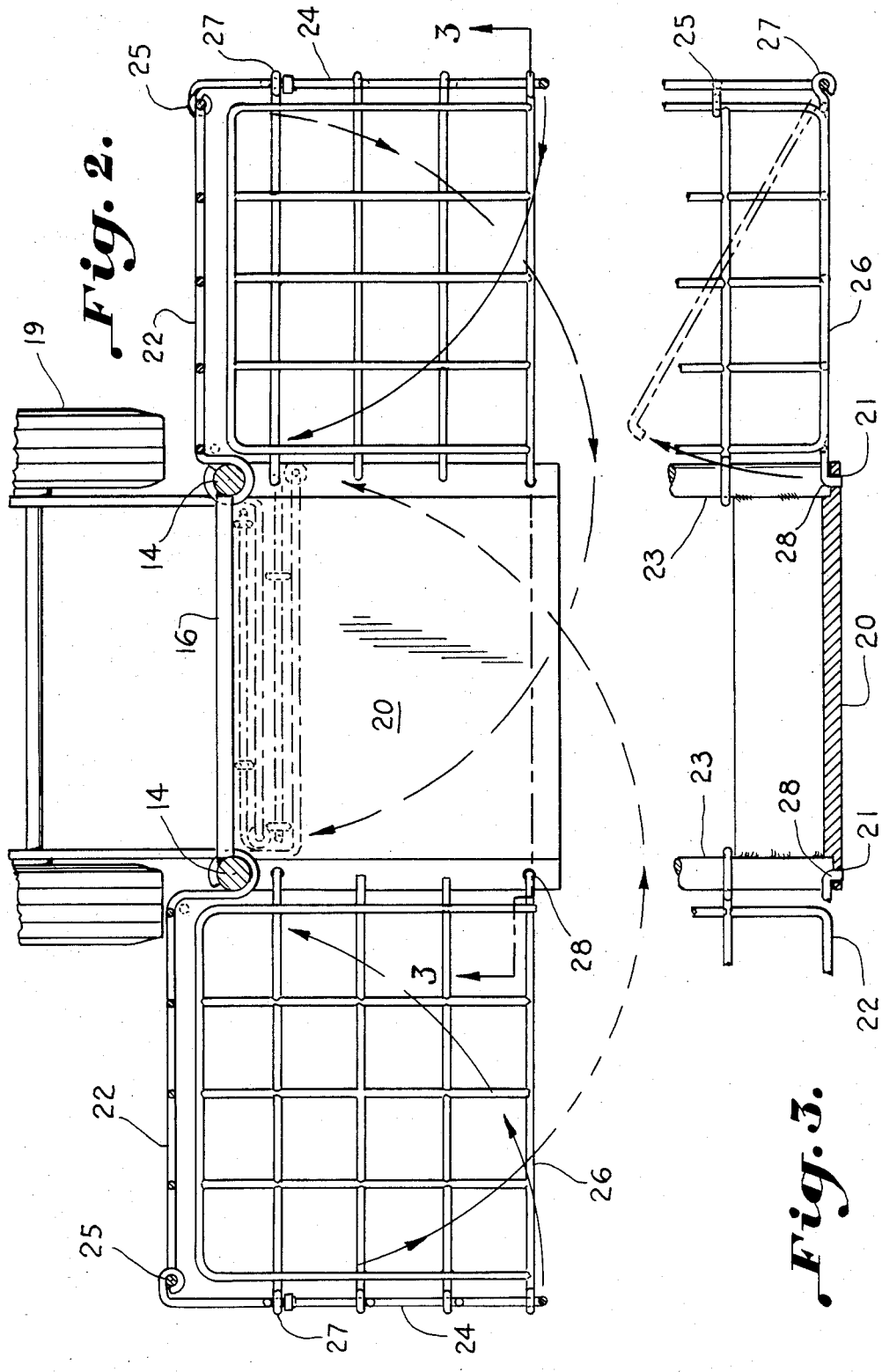

HAND TRUCK FOR HANDLING BULKY FREIGHT

BACKGROUND OF THE INVENTION

This invention relates to hand trucks and particularly to hand trucks with a collapsible supporting surface for handling bulky freight or loads.

Conventional hand trucks generally comprise a U-shaped or oval-shaped main frame with a handle at one end and an axle with wheels and a toe plate generally perpendicular to the frame at the other end. Hand trucks with collapsible platforms attached thereto are known for example in U.S. Pat. Nos. 454,461; 2,430,107; and 2,784,004. The primary drawback of such hand trucks are that the structure adds considerable weight to the hand truck and makes it difficult to hoist it manually in and out of trucks or otherwise manipulate it.

Another utility cart is shown in U.S. Pat. No. 4,220,346. This patent discloses a utility cart which has an upwardly extending frame, a pair of wheels journaled to the lower end of the frame, and a bed pivoted adjacent one of its ends on the frame at the lower end of the frame for swinging about an axis extending from one side of the frame to the other. The cart converts into a generally two-sided platform as seen in FIG. 5 for handling larger items. However, it is not adapted for handling bulky items such as baked bread or the like wherein the weight of the item is not excessive, but the bulk of it is.

Another hand truck with a collapsible supporting surface which is adaptable for converting the hand truck into a worktable is found in U.S. Pat. No. 4,284,286. The primary feature of this hand truck is that it provides an extension for the toe plate when it functions as a hand truck which then becomes a ledge to support a table top when it functions as a table. There is nothing in this patent that permits it to handle bulky freight.

SUMMARY OF THE INVENTION

It is an object of the present invention to provide a hand truck which has a freight supporting surface with three walls surrounding the platform of the truck for handling bulky freight.

Another object of the present invention is to provide a hand truck for handling bulky freight which collapses to the size of a conventional hand truck for storage and for transport from one location to another.

Another object of the present invention is to provide a hand truck which can be moved laterally such as for use in narrow passages or aisles.

Yet another object of the present invention is to provide a hand truck with a collapsible freight supporting platform bounded by three walls which is readily converted from its collapsed state into the freight handling form without the use of tools.

According to the present invention, a two-wheel hand truck is disclosed which, when folded, occupies substantially the space of a conventional two-wheel hand truck. The hand truck of the present invention has extendable platforms to extend the freight supporting surface. Three side walls are provided, one of which comprises the toe plate for supporting and containing bulky freight. The cart includes a main frame, with a handle on one end and two wheels extending from the main frame on the opposite end, along with a toe plate extending opposite to the wheels from the main frame at an angle thereto. Rollers may also be provided on the toe plate for allowing the hand truck to move laterally.

Other objects and features will be apparent from the following specification and the drawings appended thereto.

BRIEF DESCRIPTION OF THE DRAWINGS

FIG. 2 is a plan view, partially in section, taken along lines 2—2 of FIG. 1;

FIG. 3 is a front elevation, partially in section, taken along lines 3—3 of FIG. 2;

DETAILED DESCRIPTION OF THE INVENTION

Figure 1:
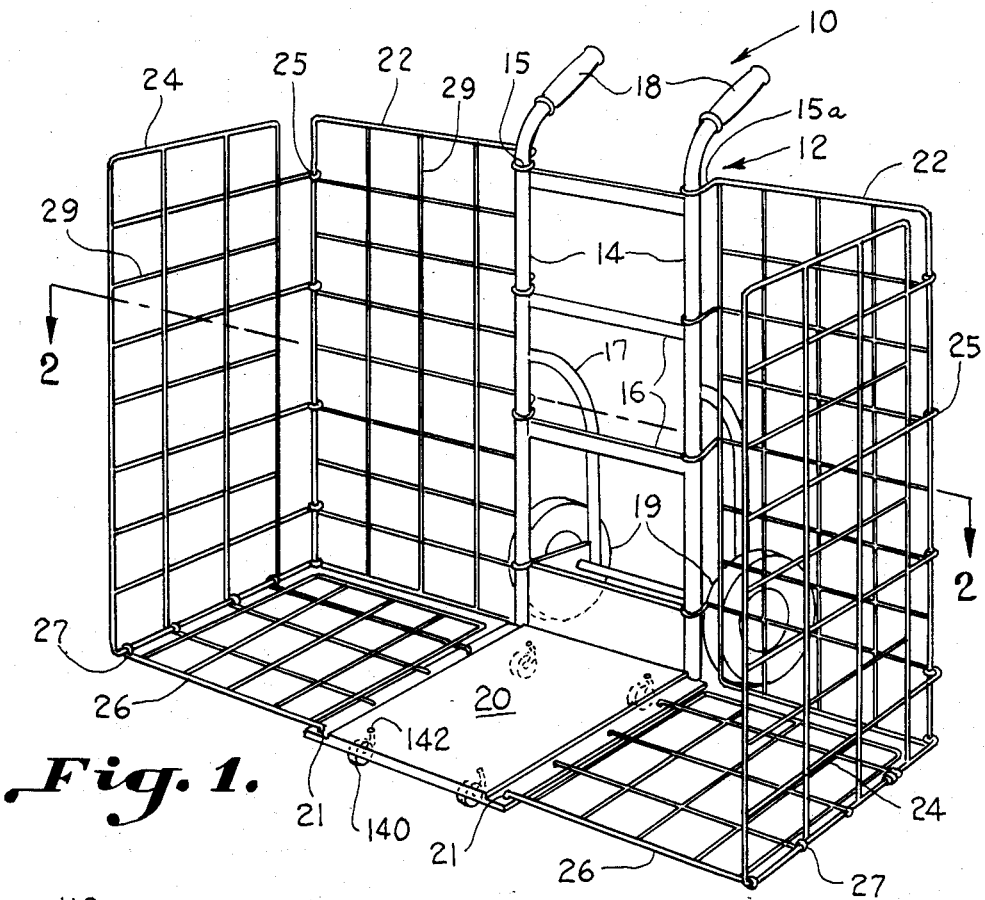
FIG. 1 is a perspective view of a hand truck according to the invention with the freight carrying compartment unfolded.

Referring now to the drawings, in particular to FIGS. 1, 2, and 3, a hand truck constructed according to the invention is designated by the general reference numeral 10. Hand truck 10 comprises a main frame, generally 12, which includes two elongated members 14 extending the length of the main frame and a plurality of transverse members 16 connecting the elongated members to support them and to hold them parallel to each other. One end of the main frame terminates into handles 18 whereas the other end of the main frame has a pair of wheels 19 rotatably attached thereto which extend from each side of the main frame. The same end terminates in a toe plate 20 which extends to the opposite side of the main frame from that on which the wheels 19 are located. The toe plate 20 has a plurality of openings 21 a purpose for which will be explained in more detail hereinafter.

Hinged about and pivoted to each of the elongated members 14 by hinges 15, 15a is a platform 22 which provides a surface generally parallel to the load carrying surface of the main frame 12. Each platform 22 is comprised of a plurality of small rods 29 welded or braised together to form a grid work similar to that used in shopping carts in the usual grocery store to provide a rigid but lightweight support surface. Each of the platforms 22 has pivoted to its edge opposite the edge hinged to the elongated members a side member 24 which is hinged about the edge of platform 22 by means of hinges 25. Each side member 24 is adapted to form a side support at the side of each platform 22 which is perpendicular thereto.

At the lower end of each side member 24 is a toe plate extension 26 which is formed of a welded grid construction similar to that of platforms 22 and side members 24. The toe plate extension 26 is pivotally connected to the bottom edge of side member 24 by means of pivots 27, and each of the toe plate extensions on their opposite edge terminate into a plurality of hook extensions 28 which enter into and engage openings 21 in the toe plate so as to maintain a rigid three-sided freight carrying cage or compartment on the hand truck suitable for handling bulky freight, for example, such as loaves of bread, plastic foam products, and the like.

The hand truck of the invention, as shown in FIGS. 1, 2, and 3, is in its expanded freight carrying configuration. However, whenever it is desired to store the hand truck, the hook extensions 28 are removed from the toe plate openings 21 and the toe plate extensions 26 are folded against its respective side wall 24. Then each side wall 24 is pivoted about pivots or hinges 25 and folded against platform 22. This procedure is done on each side of the main frame of the hand truck. After this operation has been accomplished, the right side of the hand truck as seen in FIGS. 1 and 2 is folded against the surface of main frame 12 about hinges 15a, after which the left side platform 22 as seen in FIGS. 1 and 2 is then folded against the right side platform about hinges 15 for forming a compact folded surface as shown in phantom in FIG. 2. It is to be noted that hinges 15 of the left hand side wall are longer than hinges 15a of the right hand side wall for allowing the platforms, the right hand side wall and the toe plate extensions to all be neatly folded together between the main frame and the left hand side wall, as shown in phantom in FIG. 2.

Figures 6, 7:
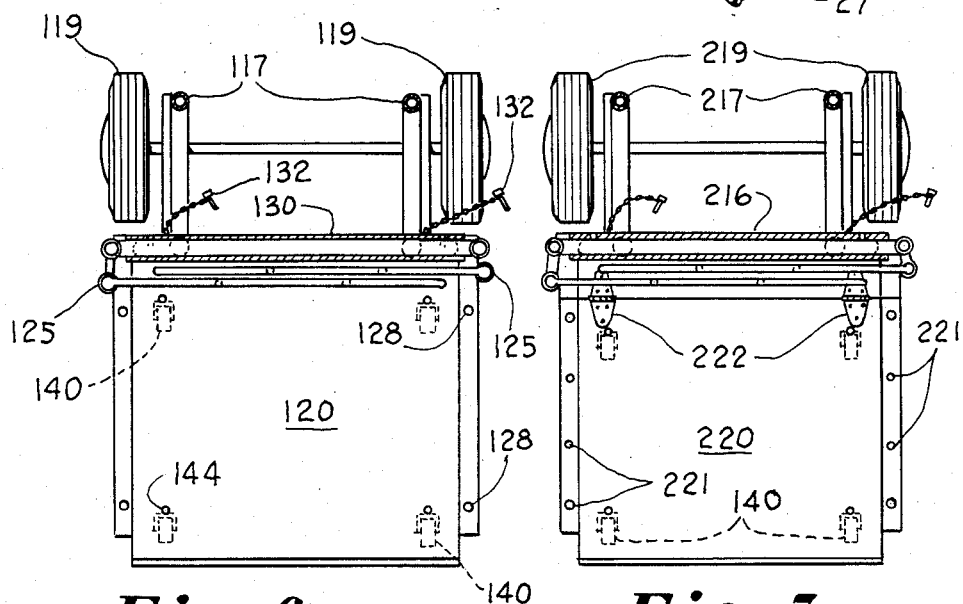
FIG. 6 is a view similar to FIG. 5 but showing the walls of the freight carrying surfaces folded up in the storing position.
FIG. 7 is a view similar to FIG. 6 but showing a third modification of the invention.
Figure 4:
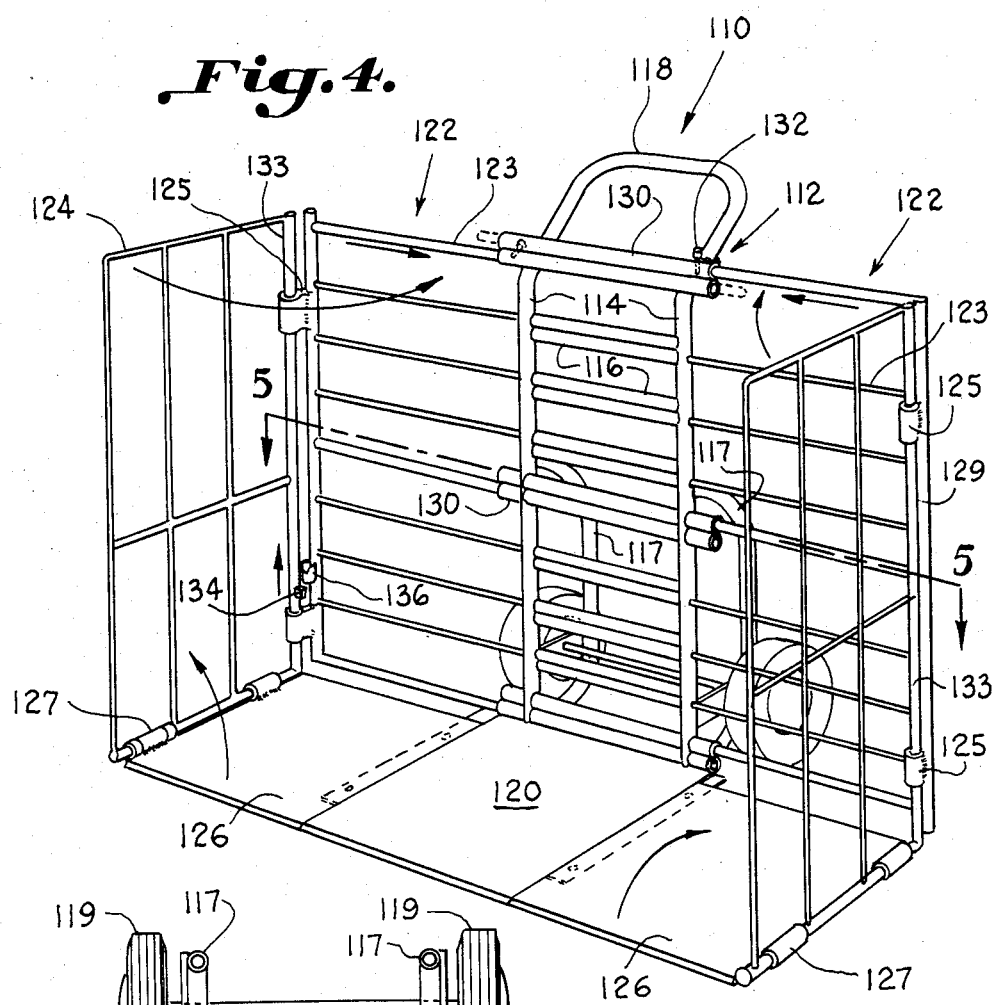
FIG. 4 is a front perspective view of a second embodiment of the hand truck of the invention.
Figure 5:
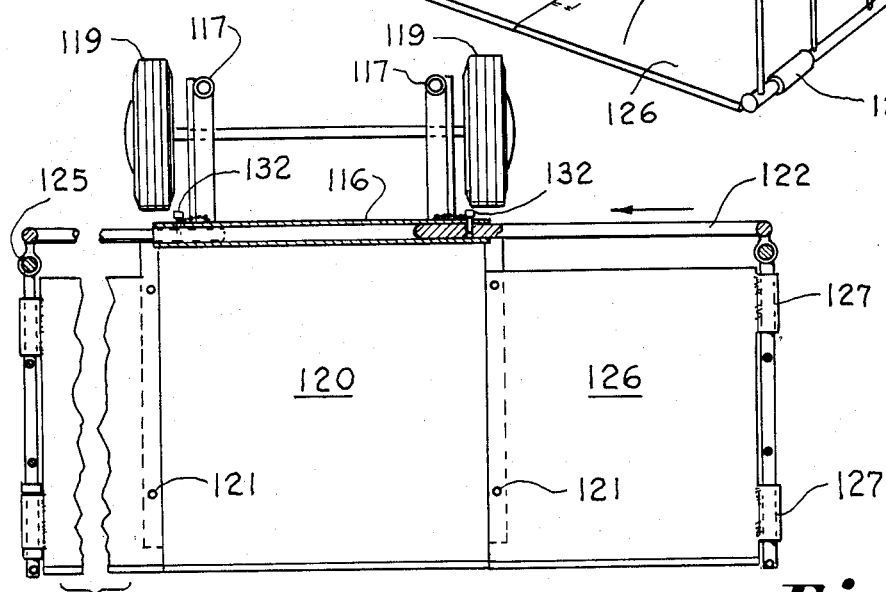
FIG. 5 is a plan view, partially in section, taken along lines 5—5 of FIG. 4.

Referring now to FIGS. 4, 5, and 6 of the drawings, a second embodiment of the hand truck of the invention is illustrated and indicated by the general reference character 110. Hand truck 110 comprises a main frame 112, composed of a pair of elongated members 114 which extend the length of the frame and which terminate on one end in a handle 118. The elongated members 114 are joined by a plurality of pairs of hollow transverse members 116. At the upper end of the main frame and in the mid-section and at the lower end of the main frame are a pair of larger transverse members 130, the purpose for which will be explained in greater detail hereinafter.

On the other end of the main frame 112 are a pair of wheels 119 which extend from one side of the main frame and a pair of skids 117 which also extends from the same side. On the opposite side of the main frame on the same end is a toe plate 120 which has a plurality of openings 121 in each of the sides thereof. Extending from each side of the main frame 112 is a platform, generally 122, which comprises a plurality of transverse steel rods 123 which are welded to an elongated frame member 129 at the edge of the platform 122 opposite from the main frame elongated member 114. Each of the transverse rods 123 of each of the platforms is supported by and engages the hollow transverse members 116 or 130 depending upon their location. As seen in FIG. 4, the platform 122 is extended from each side of the main frame and are held in place by a plurality of locking pins 132 which engage transverse holes or openings in the hollow transverse members 130 and in the rods 123 which comprise the platform 122 to lock the platform 122 in its extended position.

The edge of platform 122 away from the edge of the main frame 112 also comprises a plurality of tubular hinges 125 adapted to receive an elongated bar 133 at the edge of each side member 124 to form a hinge or pivot therewith. Thus, side members 124 are pivotally connected to platform 122 on each side of the main frame.

At the end of each side member 124 adjacent to the toe plate 120 is a toe plate extension 126 which is connected to the side member 124 by a suitable hinge 127 at one edge and has a series of openings 121 at its other edge. Upwardly extending locking pins 128 are provided on each edge of toe plate 120 for engaging openings 121 in the toe plate to lock the freight carrying cage in its expanded condition as seen FIGS. 4 and 5. It will also be noted that the hinges 125 on the left of the cage in FIGS. 4 and 5 extend further outwardly from the main frame than do the hinges on the right of the main frame in order to permit the toe plate extensions to be folded against the side members and the side members in turn to be folded against the platforms.

Thus, when it is desired to store the hand truck for transporting, toe plate extensions 126 are folded against the side members 124 on each side of the main frame. Toe plate extensions 126 and side members 124 are then folded flat against the platforms 122 on each side of the main frame. The left hand side member 124 is provided with a locking lug 134 for engagement in a locking slot 136 when the side wall 124 is folded against platform 122 on the left side of the main frame. After each of the side walls and toe plate extensions are folded against platforms 122, the locking pins 132 are removed and the platforms are each slid to a position where they rest directly over the main frame of the hand truck 112. The right hand platform as seen in FIG. 4 is first extended into the tubes and over the main frame after which the left hand platform is brought into position to overlie the right hand platform and its side members and toe plate extension to the position shown in FIG. 6 of the drawings. Thus, the engagement of lug 134 in slot 136 locks the platforms, the side members and the toe plate extensions into position overlying the main frame as seen in FIG. 6, and the hand truck is in position for storage or for transport, as the case may be.

Referring now to FIG. 7 of the drawings, wherein toe plate 220 is provided in two sections which are joined by hinges 222 which are arranged to permit toe plate 220 to be folded against the platforms, the side walls and the toe plate extensions when they are in their folded positions such as seen in FIG. 6 or as seen in phantom in FIG. 2. In this case, the toe plate may be folded to nestle against the folded toe plate extensions, side members and platforms to permit easy storage or transport of the hand truck of the invention. This modification may be made to either the embodiment of FIG. 1 or the embodiment of FIG. 4. Retention means, such as a latch or catch (not shown) could be provided for retaining the upwardly folded section of toe plate 220 against the platforms, if desired.

As shown in FIGS. 1, 6 and 7, each embodiment 10, 110 of the hand truck of the present invention can be provided with four readily detachable swivel wheels or rollers 140. Rollers 140 allow for the hand truck to be moved laterally for use in narrow passages or aisles when there is not enough room to tilt the hand truck back on wheels 19, 119. The hand truck will generally be in a substantially vertical postion when rollers 140 are to be used. Casters or rollers 140 may have upwardly extending pins 142 which are readily attachable in holes 144 in the toe plate, or other mounting adaptors (not shown) may be used. Rollers 140 are for use when the hand truck is needed in tight spaces. Otherwise, wheels 19, 119 are used for transporting a load with the hand truck.

In view of the above description, it will be understood that the hand truck of the invention has a large cage or freight supporting surface with three walls for supporting and carrying bulky freight such as loaf bread, plastic foam objects and the like. When the hand truck is not required for transporting such bulky items, the platforms, the side members and the toe plate extensions can be folded neatly against the surface of the main frame to permit the hand truck to be carried by a supply truck or to be otherwise stored without occupying an undue amount of space. In view of the above, it will be seen that the several objects of the invention has been achieved and that other advantageous results are also attained.

As various changes can be made in the above hand trucks without departing from the scope of the invention, it is intended that all matter contained in the above description or shown in the appended drawings should be interpreted as illustrated and not in a limiting sense.

What is claimed is:

1. A hand truck for carrying cargo, comprising:
   an elongated main frame having two opposing sides and defining a load bearing surface adjacent said two opposing sides, said main frame including one end terminating into a handle;
   at least two wheels attached to the other end of said main frame;
   a toe plate attached to said other end of said main frame and adapted to extend outwardly therefrom for forming a load carrying surface;
   at least two platform members, each of which being associated with each of said two opposing sides of said main frame, each said platform member being adapted for selectively extending said load bearing surface of said main frame;
   a side member connected to each said platform and extending outwardly therefrom for bordering said load bearing surface; and
   a toe plate extension connected for movement relative to each of said side members having means for engaging said toe plate and adapted for extending said load carrying surface of said toe plate, whereby each said platform, each said side member, and each said toe plate extension may be moved with respect to said main frame between an open configuration for forming a partially enclosed cargo-carrying compartment and a compacted configuration adjacent said main frame for facilitating transport and storage of the hand truck.

2. A hand truck as set forth in claim 1, wherein said main frame comprises spaced elongated members and a plurality of transverse members connected to each of said spaced elongated members.

3. A hand truck as set forth in claim 1, wherein said side members comprise a plurality of longitudinal and transverse rods welded together.

4. A hand truck as set forth in claim 1, wherein said toe plate extensions comprise longitudinal and transverse rods welded together.

5. A hand truck as set forth in claim 4, wherein said toe plate has a plurality of openings along each of its sides and said toe plate extensions terminate in a plurality of projections adapted to engage said openings when said hand truck is in said open configuration.

6. A hand truck as set forth in claim 2, wherein said platforms are pivotally attached to the elongated members.

7. A hand truck as set forth in claim 1, wherein said side members are pivotally attached to said platforms.

8. A hand truck as set forth in claim 1, wherein said toe plate extensions are pivotally attached to said side members.

9. A hand truck as set forth in claim 2, wherein said platforms are pivotally attached to said elongated members of said main frame, said side members are pivotally attached to the opposite side of each of said platforms, and said toe plate extensions are pivotally attached to one end of each of said side members.

10. A hand truck as set forth in claim 2, wherein said elongated members are connected by a plurality of hollow transverse members.

11. A hand truck as set forth in claim 10, wherein said hollow transverse members are arranged in pairs.

12. A hand truck as set forth in claim 11, wherein each of said platforms comprises a plurality of longitudinal rods and a plurality of transverse rods attached to one or more of said longitudinal rods, said rods being connected to said main frame by extending into said hollow transverse members.

13. A hand truck as set forth in claim 10, wherein said side members are pivotally attached to said platforms.

14. A hand truck as set forth in claim 10, wherein said toe plate extensions are pivotally attached to said side members.

15. A hand truck as set forth in claim 10, wherein said side members are pivotally connected to said platforms and said toe plate extensions are pivotally connected to one end of each of said side members.

16. A hand truck as set forth in claim 1, wherein said toe plate is formed in two pieces which are connected by hinge means which permits said toe plate to fold against the surface of said main frame.

17. A hand truck for handling bulky freight, comprising:
   (a) An elongated rectangular main frame having a load bearing surface and including spaced elongated members held in said spaced relation by a plurality of transverse members rigidly connected to said elongated members at spaced intervals, one end of said frame terminating in a handle;
   (b) a plurality of wheels attached to the other end of said main frame and extending outwardly from one side of said main frame;
   (c) a rectangular toe plate attached to said other end of said main frame and extending outwardly from the other side of said main frame;
   (d) a rectangular platform attached to each side of said main frame and adapted to extend the load bearing surface of said main frame;
   (e) a rectangular side member pivotally attached to the side of each of said platforms away from the side of said main frame where said platform is attached, and adapted to extend outwardly from said platform side;
   (f) a rectangular toe plate extension pivotally connected to one end of each of said side members and having means for engaging one side of said toe plate, whereby said platforms and their associated side members and toe plate extensions are adapted to be folded against said main frame for storage or unfolded and interlocked to form a three-sided compartment for handling bulky freight.

18. A hand truck as set forth in claim 17, further comprising:
   a plurality of rollers attached to said toe plate for supporting said hand truck for movement thereon, said rollers allowing said hand truck to be moved in at least one direction other than that allowed by said wheels.

* * * * *